United States Patent [19]

Malesh

[11] 3,745,298
[45] July 10, 1973

[54] FREQUENCY GENERATOR FOR ELECTRICAL DISCHARGE MACHINING

[75] Inventor: Allan B. Malesh, Homewood, Ill.

[73] Assignee: Abet Industries Corp., Broadview, Ill.

[22] Filed: Sept. 3, 1971

[21] Appl. No.: 177,803

[52] U.S. Cl. ............................................. 219/69 C
[51] Int. Cl. ............................................. B23p 1/08
[58] Field of Search ......................... 219/69 C, 69 P

[56] References Cited
UNITED STATES PATENTS

| | | | |
|---|---|---|---|
| 3,496,321 | 2/1970 | Lobur | 219/69 C |
| 3,515,838 | 6/1970 | Lobur | 219/69 P |
| 3,590,317 | 6/1971 | Sennowitz | 219/69 C |

Primary Examiner—R. F. Staubly
Attorney—Lee J. Gary, Charles F. Pigott, Jr. et al.

[57] ABSTRACT

A frequency generator for use with electrical discharge machining devices to afford automatic control of the operational duty cycle, such control being effected by monitoring cutting conditions at the cutting area or gap, reducing the duty cycle whenever the gap voltage falls below a predetermined voltage which is substantially in excess of zero voltage to automatically reduce the predetermined normal duty cycle by an amount proportional to the amount by which said gap voltage falls below said predetermined voltage, the monitoring means being continuously operable to monitor the gap voltage and thereby maintain the duty cycle at a level reduced from the normal duty cycle by an amount proportional to the amount which the gap voltage is below the predetermined voltage and to adjust the duty cycle to a predetermined minimum duty cycle if the gap voltage is reduced to zero volts.

17 Claims, 1 Drawing Figure

Patented July 10, 1973 3,745,298
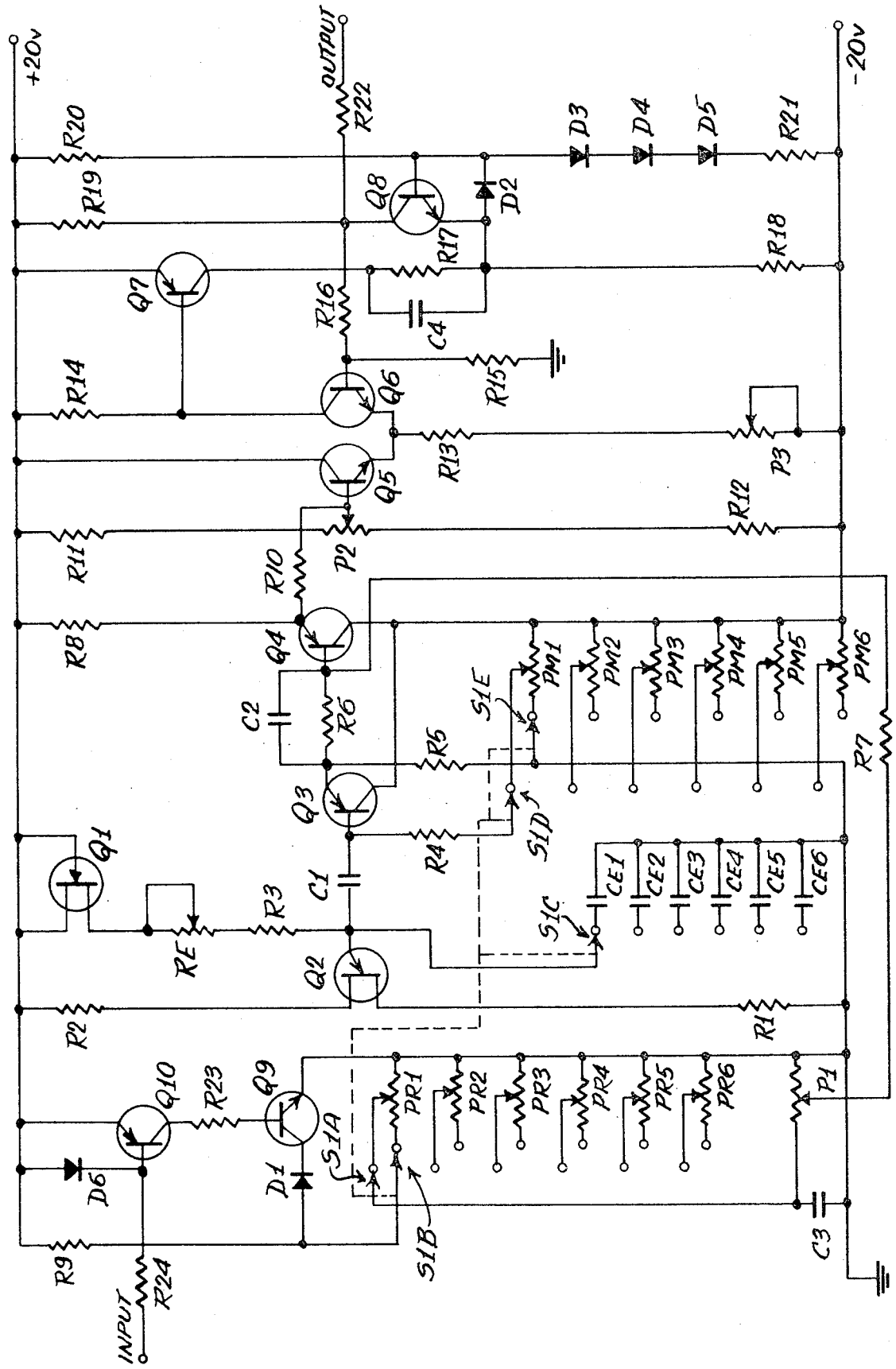

FREQUENCY GENERATOR FOR ELECTRICAL DISCHARGE MACHINING

BRIEF SUMMARY OF THE INVENTION

The present invention relates generally to electrical discharge machining, and more particularly to the provision of a frequency generator with automatic control of its operational duty cycle for use with electrical discharge machining devices, hereafter sometimes referred to as EDM machines.

Typical frequency generators for use with EDM machines provide a selection of frequencies in the range from 250 Hz to 200 KHz to pulse the associated power supply circuitry "on" and "off" for use in an EDM machining process. The wave form supplied must be of the square wave type with fast rise and fall times.

In a conventional EDM machining operation there is a small gap between the electrode or cutting tool and the workpiece, and depending upon the manufacturer of the equipment d. c. pulses of from 80 to 150 volts are applied to the gap resulting in a certain number of sparks per second across the gap. In accordance with conventional practice, the space at the gap between the electrode and the workpiece is controlled so as to adjust the voltage across the gap down to a range of 20 to 50 volts. If the machine were 100 percent efficient, the number of sparks per second would coincide with the frequency of pulses supplied by the generator. However, efficiency rates of 70 or 80 percent are commonly found, resulting in a proportionately lower number of sparks per second at the operational gap. The frequency of these pulses is determined by a control included within the frequency generator.

The operational frequency employed is dependent upon the nature of the cut to be made. Thus, for a roughing cut the lower frequencies are utilized, whereas for finer or finish cuts it is desirable to use higher frequencies. The "on" time or width of each pulse is referred to herein as the duty cycle. For example, a 90 percent duty cycle indicates that each pulse is on for 90 percent of the time and off for 10 percent of the time.

Sparks resulting from the application of such voltage pulses at the gap move around so as to follow the shortest distance between the electrode and the workpiece, resulting in erosion of the workpiece in one area and then a shift of the spark to a different area. The action of the spark on the workpiece as it erodes the latter produces chips somewhat spherical in shape and referred to herein as "spheres." As spheres are formed during an EDM machining operation they are flushed out of the gap by the liquid in which the electrode and workpiece are submerged.

As described above, the voltage at the gap is adjusted between 20 and 50 volts in order to obtain optimum cutting operation. If the spheres are not flushed out of the gap, they tend to build up and cluster together attracting the spark from the electrode toward the shorter path which they provide to the workpiece. Such action will have the effect of reducing the voltage across the gap, and the resultant concentration of spark at one location can cause serious damage to the workpiece as well as to the EDM power supply.

In preparing for an EDM machining operation, the operator will adjust the frequency control in accordance with the type of material to be machined and the type of cut to be made. In addition, the operator selects a desired duty cycle, sometimes starting with an adjustment on the low side and subsequently increasing the predetermined duty cycle after it has been determined that the sphere buildup is not excessive.

EDM machines conventionally are equipped with a servo system which monitors the voltage at the gap and controls the spacing at the gap so as to maintain a predetermined gap voltage. As described above, the range of voltage is normally between 20 and 50 volts, and the power supply servo amplifier is adjusted to provide the desired voltage within such range. The servo system monitors the actual voltage and compares it with the set reference voltage, and it then backs the electrode away if the gap voltage is too low or advances the electrode closer to the workpiece to reduce the gap if the voltage is too high.

However, the foregoing known apparatus is not a satisfactory solution to gap problems since particles or spheres will sometimes accumulate along the side of an electrode, particularly when making a deep cut. Under such circumstances, backing off the electrode will not necessarily free such spheres, with the result that continued sparking will occur at the accumulated particles or spheres as the electrode is backing away from the workpiece, thereby causing damage to the latter. Moreover, frequent backing away of the electrode increases required machining time and results in additional problems relative to reestablishment of proper conditions at the gap when the electrode is again advanced.

Certain known EDM machines incorporate a current cut-off device for the purpose of protecting against gap problems. Such a device monitors the current at the gap, and if the current rises too high it will shut off the current for a period of time. Alternately, voltage at the gap may be monitored and the current removed if the voltage falls below acceptable limits. Such arrangements shut off the current completely when a problem develops at the gap, and then after a predetermined time the current is restored. Obviously, if the problem at the gap still exists, the circuit breaker or switching operation will be repeated to again remove current from the work area. Such action will continue until the gap problem is eliminated. However, such current cut-off devices are subject to the disadvantage that difficulty will often be encountered in reestablishing cutting conditions at the gap when the current is restored. In another variation of the foregoing known apparatus, power cutoff based upon monitoring of gap conditions has been done in steps rather than as a single operation. Thus, transistors have been employed for controlling the supply of power to the gap, but reducing current in this manner effectively changes the output "on" impedance to the power supply with attendant problems often resulting when normal conditions are restored.

In accordance with the present invention, cutting conditions are monitored at the gap and the duty cycle is automatically adjusted directly proportional to gap conditions. Thus, by means of a potentiometer, "on" time may be adjusted between 10 and 90 percent. When the gap voltage drops below 20 volts, the duty cycle "on" time begins to decrease from its predetermined setting. The greater the drop below 20 volts, the greater the reduction of the duty cycle from its initial setting, in contrast with conventional machines where the initial duty cycle once adjusted remains fixed at the selected value. At zero volts, the duty cycle "on" time is at a minimum of 5 percent "on." Retention of a 5 percent pulse "on" time is requird so that a pulse signal is still at the gap which can be monitored by the gap sensor to enable the circuit to continue to determine the gap condition. As the gap is cleared of debris, and voltage is restored to the 20 volt operating level or above, the duty cycle will be returned to its original setting. A built-in time lag in the change of the duty cycle in either direction eliminates unstable conditions at the gap which would occur if the duty cycle were varied too quickly.

When the duty cycle or "on" time of the pulses from the power supply are reduced, current is effectively limited to the gap, resulting in the production of smaller particles or spheres from erosion of the workpiece. By reducing such particle size, effective operation of the flushing system to clear out the particles is permitted thus preventing further buildup of additional particles. Moreover, under such conditions, sparks within the gap may also serve to break up a larger particle into smaller spheres. Where spheres or particles have accumulated causing a problem at the gap, it is undersirable to continue with full current, since the spheres themselves may function as an electrode and thereby cause damage to the workpiece. As soon as the problem has been eliminated and the gap voltage is restored to 20 volts or more, the duty cycle is restored to its initial setting.

The present invention reduces required machining time and affords protection of the integrity of the workpiece and protection for the power supply by preventing excessive current overload. In accordance with the invention, by monitoring the voltage at the gap and taking corrective measures, a smooth limitation of current is provided with a built-in time delay that discounts any situation where gap voltage momentarily fluctuates up and down. Such time delay permits reading of an average voltage and changes the duty cycle accordingly.

As is the case with conventional EDM machines, the duty cycle may be set initially between 10 and 90 percent. The amount of automatic reduction of the duty cycle depends upon how far the voltage drops below 20 volts. For example, if the duty cycle is set at 90 percent and the voltage remains at 20 volts or higher, no change will occur in the duty cycle. However, if the voltage drops to 10 volts, i.e., one-half of the amount from 20 volts to zero volts, then the duty cycle will be reduced by one-half the amount from the set 90 percent duty cycle to the minimum 10 percent duty cycle, i.e., a reduction to a 50 percent duty cycle. An important advantage of the present invention is that it may be added to existing EDM machines without extensive modification, and will result in improved operation thereof.

It is therefore an object of the present invention to provide an improved power supply for an electrical discharge machining device which functions to monitor the voltage at the gap between the EDM electrode and the workpiece being machined and which reduces the duty cycle of the applied pulses when such gap voltage falls below a predetermined level.

A further object is to provide an improved EDM power supply as last above-mentioned where the amount by which the duty cycle is reduced is proportional to the amount by which the gap voltage falls below a given predetermined value.

The foregoing and other objects and advantages of the invention will be apparent from the following description of a preferred embodiment thereof, taken in conjunction with the accompanying drawings.

DESCRIPTION OF THE DRAWING

The single FIGURE comprises a schematic circuit diagram of a frequency generator constructed in accordance with the present invention.

Now, in order to acquaint those skilled in the art with the manner of making and using my invention, I shall describe, in conjunction with the accompanying drawing, a preferred embodiment of the invention.

DETAILED DESCRIPTION OF THE INVENTION

Referring now to the drawing, an understanding of the present invention may be had by reference to the following description of its arrangement and operation.

A frequency generator is shown including a gap monitoring circuit comprising transistors Q9 and Q10 both of which function as amplifiers, with their associated components including resistors R24, R23 and R9 and diodes D1 and D6. Field effect transistor Q1 and unijunction transistor Q2, along with their associated components comprising resistors R1 to R3 inclusive, potentiometer RE and capacitors C1 and CE1 to CE6 form a relaxation oscillator with the value of capacitor CE being selectable to permit selection of several operating frequencies.

The output of the foregoing oscillator is coupled through capacitor C1 to the base of transistor Q3. The transistor Q3 is associated with resistors R4 and R5, and potentiometers PM1 to PM6 which are utilized to adjust the minimum duty cycle of the generator. The foregoing components comprise an emitter follower amplifier the output of which is applied through a coupling network comprising resistor R6 and capacitor C2 to the base of transistor Q4 which with its associated resistors R7 and R8 form another emitter follower amplifier.

The output of the foregoing stage is coupled through resistor R10 to a differential amplifier comprising transistors Q5 and Q6, resistors R11 through R15 and potentiometers P2 and P3. The remaining circuitry includes transistors Q7 and Q8, resistors R16 through R22 inclusive, capacitor C4 and diodes D2 through D5, which function as a squaring circuit which creates a fast rise and fall time to the square wave which is required for the output stages of the power supply.

Switch S1 including sections S1A and S1B are employed to select one of the potentiometers PR1 through PR6 which are utilized to determine the maximum duty cycle of the present pulse generator. Switch S1, section S1C, is utilized to select one of the capacitors CE1 to CE6 inclusive which determine the basic operating frequency of the output of the generator of the present invention. Switch S1, sections S1D and S1E are utilized to select one of the potentiometers PM1 through PM6 inclusive to determine the minimum duty cycle of the generator. It will thus be understood that the above switch S1, sections S1A, S1B, S1D and S1E, are employed to determine particular minimum and base duty cycle values. Since such switches are connected to potentiometers, the particular values selected may be further adjusted by operation of the potentiometers themselves. In normal usage, the potentiometers will initially be set to particular predetermined values, and then selection of such predetermined values can be made by the operator through operation of the switch S1 and potentiometer P1.

The above-described circuitry functions in the following manner: Field effect transistor Q1 acts as a constant current source charging capacitor CE1, or capacitors CE2 to CE6, with the rate of current flow being adjusted by potentiometer RE. Unijunction transistor Q2 functions to produce a linear ramp or sawtooth wave output train of pulses the frequency of which is determined by capacitor CE1. Such pulses are coupled through capacitor C1 to the base of transistor Q3 which as noted previously functions as an emitter follower amplifier. At this same point one side of resistor R4 is connected with the other side of R4 connected to potentiometer PM1, or PM2 to PM6, whose adjustment determines the minimum duty cycle of the generator. Potentiometer PM1 is normally adjusted to yield a 10 percent duty cycle at the output of the generator when the operator's control potentiometer P1 is turned counterclockwise. The negative potential thus derived and applied to the base of transistor Q3 permits shifting the peak amplitude of the output pulses appearing at the emitter of transistor Q3 from −2 to −15 volts. These pulses are coupled through an RC network comprising C2 and R6 to the base of transistor Q4. Also connected to the base of transistor Q4 is a potential of from 0 to +5 volts coupled through resistor R7 which is connected to the arm of potentiometer P1. Adjustment of potentiometer P1 determines the basic duty cycle of the generator, i.e., from 10 to 90 percent "on" time. As potentiometer P1 is rotated, the voltage varies from 0 to 5 volts causing the ramp signal at the base of Q4 to be shifted up or down as P1 is operated back and forth.

The train of pulses is taken from the emitter of Q4 through resistor R10 into the differential amplifier, conducting the train of pulses to the base of transistor Q5. The d.c. bias level for the base of transistor Q5 is adjustable by means of potentiometer P2 which is included in a voltage divider that also includes resistor R11 and R12. Through such divider the d.c. bias is adjusted to a level of −1 volt. The emitter voltage of Q5 and Q6, derived from −20 volts through potentiometer P3 and resistor R13, is −0.4 volts, so that without an input signal into the base of transistor Q5, the same will be reverse biased thereby turning it off and permitting transistor Q6 to conduct through forward bias from a voltage divider network including resistors R15, R16 and R19.

During the initial portion of the cycle the voltage level is below −0.4 volts, the emitter voltage of Q5 and Q6. As the voltage rises above −0.4 volts, transistor Q5 becomes forward biased causing it to conduct and forcing transistor Q6 to turn off. At the end of the cycle the signal drops below 0.4 volts at which time Q5 turns off and transistor Q6 is again rendered conductive. At the collector of transistor Q6 the voltage drops when it conducts causing transistor Q7 to be forward biased permitting conduction. When transistor Q6 is turned off, its collector voltage rises causing transistor Q7 to be reverse biased thereby turning it off.

The rapid switching of the differential amplifier comprising transistors Q5 and Q6 causes a square wave to form at the output of transistor Q6. It is this output that is applied to the base of transistor Q7. If the operator has potentiometer P1 set for a 50 percent duty cycle, the ramp signal to the input of Q5 shifts from −2.5 volts to +2.5 volts for each cycle. As may be noted, transistor Q7 will thus be caused to conduct 50 percent of the time and be cut off 50 percent of the time, yielding a 50 percent duty cycle "on" time at the output of the circuit, because the 0.4v triggering point of Q5 is midway between −2.5v and +2.5 volts.

The portion of the circuitry described thus far comprises a frequency generator with a voltage controlled duty cycle which may be manually adjusted by potentiometer P1 as required. As previously described, the voltage derived from potentiometer P1 shifts the ramp signal at the base of transistor Q4 which in turn determines the duty cycle as transistors Q5 and Q6 conduct alternately. Potentiometers PR1 to PR6 are connected at one end to ground or zero volt potential, while their opposite ends are connected to the +20 volts bus through resistor R9.

The foregoing components comprise a voltage divider with approximately +19 volts appearing across the potentiometers, since the value of each potentiometer is ten times that of resistor R9. The arm of the desired potentiometer PR is adjusted so that a +5 volt potential is available at one end of potentiometer P1. At the junction of resistor R9 and the PR potentiometers, the collector of transistor Q9 is connected through diode D1. The emitter of transistor Q9 is connected to ground so that transistor Q9 and diode D1 are in parallel with potentiometer PR. A coupling resistor R23 connects the collector of transistor Q10 to the base of transistor Q9 with the emitter of transistor Q10 connected to the +20 volt bus.

The condition at the gap of an EDM machine is monitored by connecting the voltage appearing across the gap through resistor R24 to the base of transistor Q10. As long as the gap voltage remains above +20 volts, transistor Q10 will remain reverse biased and will not conduct. When the gap voltage falls below +20 volts, transistor Q10 will become forward biased and begin conducting. Relatively high values are employed for resistors R23 and R24 so that conduction of transistors Q9 and Q10 increases linearly as the gap voltage falls from +20 volts toward zero volts. Because of such linear conductivity, transistor Q9 gradually reduces to ground the voltage at the junction of potentiometer PR1, resistor R9 and diode D1, thereby also causing the voltage at the arm of potentiometer PR to drop to zero volt.

A predetermined delay in the drop of voltage across potentiometer P1 occurs due to capacitor C3 which in its fully charged condition acts to maintain a +5 volt potential at the potentiometer P1. Eventually such stored voltage discharges through one-half of the potentiometer PR1, through diode D1 and transistor Q9 to ground. When capacitor C3 has a value of 500 microfarads, a 3 ½second delay is obtained in the reduction to zero voltage. As soon as the gap voltage is restored to above +20 volts, transistors Q9 and Q10 will turn off and capacitor C3 will recharge up to +5 volts, at which time the duty cycle will be back at its normal or desired setting. If the gap voltage drops, for example, to +10 volts, the duty cycle will fall to midway between the desired setting and the minimum value, and it will remain at such level until the gap voltage changes in either direction and will then follow accordingly.

Because of the rapid switching of the differential amplifier comprising transistors Q5 and Q6, a square wave output is generated, which in turn is applied to the base of transistor Q7 from which an output is derived. The remaining circuitry including transistors Q7 and Q8 and their associated components take the square wave obtained at the collector of transistor Q6 and produce a wave form that has faster rise and fall times than that obtainable at the output of transistor Q6.

Assuming the input signal at the base of transistor Q5 is below the point at which conduction starts, transistor Q6 will conduct causing the voltage on its collector to drop to approximately +19 volts. Since the base of transistor Q7 is tied at this point, and its emitter is at +20 volts, transistor Q7 will be forward biased allowing conduction. As may be observed, there are two current paths from transistor Q7, the first being from +20 volts through transistor Q7 and resistors R17 and R18 to the −20 volt bus. The second path is from +20 volts through transitor Q7, resistor R17, diodes D2 through D5 and resistor R21 to the −20 volt bus.

The emitter and base of transistor Q8 are connected across diode D2, and because of the above-described current flow through diode D2, transistor Q8 will be reverse biased and thus non-conductive. Under such conditions, the output taken through resistor R22 will be +15 volts. Such potential is derived at the junction of resistors R16 and R19 which in combination with resistor R15 form a voltage divider network. The base of transistor Q6 is also tied to the foregoing voltage divider between resistors R16 and R15 so that transistor Q6 receives positive feedback from the generator output.

When transistor Q6 is conducting, the output is positive, which makes the base of transistor Q6 positive, causing it to be driven further into conduction. When the output is at a negative level, transistor Q6 will not conduct because its base will be more negative than its associated emitter, and being tied to the output through resistor R16, it is forced to be more negative to keep Q6 from conducting.

When the signal at the base of transistor Q5 rises above the 0.4v tripping point mentioned earlier, transistor Q5 will begin to conduct causing transistor Q6 to turn off whereby the collector voltage of the latter will be approximately +20 volts. Since the emitter of transistor Q7 is tied directly to the +20 volt bus, transistor Q7 will no longer be forward biased and will turn off. The two current paths previously mentioned from transistor Q7 to the −20 volt bus thus cease to flow. The base of transistor Q8 is at a −17 volt level derived from a voltage divider comprising resistor R20, diodes D3 through D5, and resistor R21, with the base of transistor Q8 connected between resistor R20 and diode D3. The emitter of transistor Q8 is connected to −20 volts through resistor R18 and thus is forward biased permitting conduction of transistor Q8.

A path therefore exists from the −20 volt bus through resistor R18, transistor Q8 and resistor R19. This path forms a voltage divider network across the +20 and −20 volt supplies, with the output connected between transistor Q8 and resistor R19. Such divider network has the end effect of causing the output of the generator to drop to a −13 volt level without load, giving a bipolar output from the generator. By employing high speed switching transistors for Q7 and Q8, and not driving them into saturation, fast rise and fall times are thereby achieved in the present circuitry.

I claim:

1. For use with an electrical discharge machining device, a frequency generator comprising:
a pulse source operated to produce a continuous train of pulses at a predetermined frequency;
output means connected to said electrical discharge machining device, operable to produce a continuous train of bipolar pulses for conduction to said electrical discharge machining device;
duty cycle control means connected between said pulse source and said output means, initially adjustable manually to determine the duration of each of said pulses produced by said pulse source;
said output means operated in response to said pulses of adjusted duration;
monitoring means connected between said electrical discharge machining device and said duty cycle control means, operated in response to detection of a decrease in potential at said electrical discharge machining device, below a predetermined value to automatically adjust said duty cycle control means to vary the duration of said pulses from said pulse source whereby said output means is further operated to vary the duration of said bipolar pulses conducted to said electrical discharge machining device, from the manually determined duration; and
said monitoring means being operable in response to a reduction in gap voltage at said electrical discharge machining device below a predetermined voltage substantially in excesss of zero voltage to automatically reduce the duty cycle from a predetermined normal duty cycle by an amount proportional to the amount by which said gap voltage falls below said predetermined voltage, said monitoring means being continuously operable to monitor said gap voltage so as to continuously maintain said duty cycle at a level reduced from said normal duty cycle by an amount proportional to the amount which said gap voltage is below said predetermined voltage and to adjust said duty cycle to a predetermined minimum duty cycle if said gap voltage is reduced to zero volts.

2. A frequency generator as claimed in claim 1 wherein said train of continuous pulses produced by said pulse source are of saw-tooth wave form.

3. A frequency generator as claimed in claim 1 wherein said pulse source includes means for manually selecting the frequency of operation of said pulse source.

4. A frequency generator as claimed in claim 1 wherein said duty cycle control means include selection means manually operated to select the duration of said pulses.

5. A frequency generator as claimed in claim 4 wherein said selection means include first adjustable means for determining the basic duration of said pulses.

6. A frequency generator as claimed in claim 4 wherein said selection means include second adjustable means for determining the minimum duration of said pulses.

7. A frequency generator as claimed in claim 4 wherein said selection means include third adjustable means for determining the maximum duration of said pulses.

8. A frequency generator as claimed in claim 4 wherein said selection means include first adjustable means for determining the basic duration of said pulses, second adjustable means for determining the minimum duration of said pulses and third adjustable means for determining the maximum duration of said pulses.

9. A frequency generator as claimed in claim 4 wherein said monitoring means include potential magnitude detecting means connected between said electrical discharge machining device and said selection means, said detecting means being operated in response to detection of said potential magnitude at said device being different than a predetermined value to automatically further adjust said selection means to redetermine the duration of said pulses.

10. A frequency generator as claimed in claim 1 wherein said output means comprise a differential amplifier connected between said duty cycle control means and said electrical discharge machining device, said differential amplifier being periodically operated in response to pulses of adjusted duration from said duty cycle control means to conduct bipolar pulses to said electrical discharge machining device.

11. A frequency generator as claimed in claim 10 wherein said output means further include shaping means connected between said differential amplifier means and said electrical discharge machining device, said shaping circuit being operated to modify the waveform of said bipolar pulses conducted to said electrical discharge machining device.

12. For use with an electrical discharge machining device, a frequency generator comprising:
a pulse source operated to produce a continuous train of pulses at a predetermined frequency;
output means connected to said electrical discharge machining device, operable to produce a continuous train of bipolar pulses for conduction to said electrical discharge machining device;
duty cycle control means connected between said pulse source and said output means, initially adjustable manually to determine the duration of each of said pulses produced by said pulse source, said duty cycle control means including selection means manually operated to select the duration of said pulses including adjustable means for determining the maximum duration of said pulses; and
monitoring means connected between said electrical discharge machining device and said duty cycle control means, operated in response to detection of a decrease in potential at said electrical discharge machining device, below a predetermined value to automatically adjust said duty cycle control means to vary the duration of said pulses from said pulse source whereby said output means is further operated to vary the duration of each of said bipolar pulses conducted to said electrical discharge machining device from the manually determined duration, said monitoring means including potential magnitude detecting means connected between said electrical discharge machining device and said adjustable means, said detecting means being operated in response to detection of said potential magnitude at said device being less than a predetermined value to automatically further adjust said adjustable means to redetermine the maximum duration of said pulses.

13. For use with an electrical discharge machining device, a frequency generator comprising:
a pulse source operated to produce a continuous train of pulses at a predetermined frequency;
output means connected to said electrical discharge machining device, operable to produce a continuous train of bipolar pulses for conduction to said electrical discharge machining device;
duty cycle control means connected between said pulse source and said output means, initially adjustable manually to determine the duration of each of said pulses produced by said pulse source;
said output means operated in response to said pulses of adjusted duration and comprising a differential amplifier connected between said duty cycle control means and said electrical discharge machining device, said differential amplifier being periodically operated in response to pulses of adjusted duration from said duty cycle control means to conduct bipolar pulses to said electrical discharge machining device;
monitoring means connected between said electrical discharge machining device and said duty cycle control means, operated in response to detection of a decrease in potential at said electrical discharge machining device below a predetermined value to automatically adjust said duty cycle control means to vary the duration of said pulses from said pulse source whereby said output means is further operated to vary the duration of each of said bipolar pulses conducted to said electrical discharge machining device from the manually determined duration;
said output means further including shaping means connected between said differential amplifier means and said electrical discharge machining device, said shaping circuit being operated to modify the waveform of said bipolar pulses conducted to said electrical discharge machining device; and
said shaping means including feedback means connected to said differential amplifier, whereby said differential amplifier operational time is reduced in response to the polarity of pulses conducted to said electrical discharge machining device.

14. For use with an electrical discharge machining device, a frequency generator comprising:
a pulse source operated to produce a continuous train of pulses at a predetermined frequency;
output means connected to said electrical discharge machining device, operable to produce a continuous train of bipolar pulses for conduction to said electrical discharge machining device;
duty cycle control means connected between said pulse source and said output means, initially adjustable manually to determine the duration of each of said pulses produced by said pulse source;
said output means operated in response to said pulses of adjusted duration and comprising a differential amplifier connected between said duty cycle control means and said electrical discharge machining device, said differential amplifier being periodically operated in response to pulses of adjusted duration from said duty cycle control means to conduct bipolar pulses to said electrical discharge machining device;
shaping means connected between said differential amplifier means and said electrical discharge machining device, said shaping circuit being operated to modify the waveform of said bipolar pulses conducted to said electrical discharge machining device; and said shaping means comprising a first switch having an input connected to said differential amplifier, and a second switch including an input connected to said first switch and an output connected to said electrical discharge machining device, said first switch being operated upon operation of said differential amplifier in response to the presence of a pulse of adjusted duration to operate said second switch to conduct pulses of a first polarity to said electrical discharge machining device, and said first switch being further operated upon further operation of said differential amplifier in response to absence of pulses of adjusted duration to operate said second switch to connect pulses of a second polarity to said electrical discharge machining device.

15. A method of controlling an electrical discharge machining operation so as to prevent damage to the workpiece and to the EDM power supply when a breakdown occurs at the gap between the electrode and the workpiece comprising the steps of sensing when the gap voltage falls below a predetermined voltage substantially in excess of zero volts, reducing the duty cycle from a predetermined normal duty cycle by an amount proportional to the amount by which the gap voltage falls below said predetermined voltage, continuously monitoring said gap voltage so as to continuously maintain said duty cycle at a level reduced from said normal duty cycle by an amount proportional to the amount which said gap voltage is below said predetermined voltage, and adjusting said duty cycle to a predetermined minimum duty cycle when said gap voltage is reduced to zero volts.

16. A method as defined in claim 15 where said predetermined voltage is approximately 20 volts.

17. A method as defined in claim 15 where a time delay is provided between a change in said gap voltage and a corresponding change in said duty cycle.

* * * * *